United States Patent [19]

Buckley et al.

[11] 4,143,171

[45] Mar. 6, 1979

[54] GELATINIZED ANIMAL FOOD PRODUCT

[75] Inventors: Keith Buckley, Melton Mowbray; David Barker, Barrow-on-Soar, both of England

[73] Assignee: Mars Limited, London, England

[21] Appl. No.: 826,827

[22] Filed: Aug. 22, 1977

Related U.S. Application Data

[63] Continuation of Ser. No. 566,415, Apr. 9, 1975, abandoned.

[30] Foreign Application Priority Data

Apr. 11, 1974 [GB] United Kingdom .............. 16237/74

[51] Int. Cl.$^2$ ........................... A23L 1/04; A23L 1/31
[52] U.S. Cl. .................................. 426/331; 426/573; 426/574; 426/805
[58] Field of Search ............... 426/573, 577, 321, 331, 426/332, 802, 805, 574, 104, 96

[56] References Cited

U.S. PATENT DOCUMENTS

| | | | |
|---|---|---|---|
| 3,519,434 | 7/1970 | Schuppner | 426/574 |
| 3,736,148 | 5/1973 | Katz | 426/321 |
| 3,862,336 | 1/1975 | Kafsky | 426/1 |
| 3,873,736 | 3/1975 | Palmer et al. | 426/92 |
| 3,899,480 | 8/1975 | Kimura | 426/104 |

OTHER PUBLICATIONS

Hackh's Chemical Dictionary, 4th ed., 1969, p. 394.

*Primary Examiner*—Jeanette M. Hunter
*Attorney, Agent, or Firm*—Davis, Hoxie, Faithfull & Hapgood

[57] ABSTRACT

The invention relates to food products and provides novel foods for animals, especially pets. In particular the invention relates to coherent elastic semi-moist food products which are stabilized against bacterial growth by the inclusion of humectants at reduced water activity. The products include subdivided protein material bound together with a gel formed by a polysaccharide gelling agent containing monosaccharide units other than (including in addition to) glucose residues and preferably having free or esterified acidic substituent groups. A preferred example of such a gelling agent is a mixture of xanthan and carob gums. Quantities of gelling agent in the range 0.2 to 5% are preferred and the moisture content should be from about 30% to 70%, the humectant concentration of about 5% to about 40% by weight, the pH between about 3.5 and about 7.5, and the water activity (Aw) below 0.95 or below 8.5 depending on the acidity of the product. The invention allows for the preparation of meat-like products for animals having an elastic coherent structure with a high gel strength from the less attractive varieties or cuts of meats or offals.

9 Claims, No Drawings

GELATINIZED ANIMAL FOOD PRODUCT

This is a continuation of application Ser. No. 566,415, filed Apr. 9, 1975 now abandoned.

This invention relates to food products and more especially it relates to food products for animals. In certain of its aspects it provides products having the texture, taste and appearance of meat.

There is an increasing interest in the preparation of meat-like products from what are generally unacceptable protein sources such as the less attractive varieties or cuts of meat or offals, as for example tripe, or from vegetable proteins.

The preparation of meat-like products for animals is complicated by the frequent desire to formulate products which are microbiologically stable without the need for elaborate packaging or storage.

One recent approach to the preparation of meat-like products for animals has been that of semi-moist products stabilized by humectants at reduced water activity ($A_w$). Semi-moist products are usually plastic deformable materials, but it is possible to obtain elastic coherent masses of improved chewing properties by the inclusion of relatively high levels of a heat coagulable protein such as gluten, as described in co-pending application Ser. No. 245,626 issued as U.S. Pat. No. 3,873,736. These proteins however require extraction from a natural source and are relatively expensive.

It has now been found that it is possible to obtain an elastic coherent structure using an alternative approach.

According to this invention there is provided a food product comprising subdivided edible protein material bound together in a matrix of a thermoreversible gel prepared from a gelling agent comprising a polysaccharide containing monosaccharide units other than glucose residues, and stabilized against bacterial growth by at least one water-soluble humectant substance.

The preferred products contain from about 30% to 70% by weight of water and from about 5% to about 40% by weight of at least one humectant, having a water activity of from about 0.75 to about 0.95 and a pH of between about 3.5 and about 7.5, the total concentration of humectant plus moisture in the product being greater than about 40% by weight and more especially greater than 45% by weight.

Of particular interest among the products of this invention are, first, those compositions having a pH value below 4.5 and a water activity below 0.95 and, second, those having a pH between 5.5 and 7.5 and a water activity below 0.85.

As will be apparent, the water activity of the product can be adjusted by altering either or both of the moisture content and the humectant content of the formulation used. Indeed, it is the relationship between the concentration of the humectant and the moisture content which mainly determines the water activity. A given water activity may be achieved by having a low level of both humectant and moisture, or a high level of both. It is to be noted, however, that if the combined level of humectant plus moisture becomes too low the gel structure will not form and a plastic product of greater or less stiffness will result.

The actual strength of the product depends, among other things, upon the type of protein material used. The protein material may be naturally moist, as in the case of fresh or cooked meat, offal or fish, or relatively dry, as in the case of meat meal. It may be subdivided as by cutting into pieces of desired size or by mincing, or by comminution to finer particle sizes, as with meals. Meats with a marked fibrous structure such as muscle meat produce very strong firm gels, whereas tripe which has less fibrosity gives a weaker structure. Meat meals give a much weaker structure, in which it is necessary to increase the gelling agent concentration to maintain an acceptable product.

The preferred protein material is therefore meat having some fibrosity, though meat meals, fish meals, and vegetable proteins can be employed. The preferred amount of protein material is from 10 to 80% by weight of the product, and in the case of natural meats or fish of normal moisture content from 30 to 80%.

The humectant can be any of a variety of water soluble substances, including those conventionally used in the formulation of food products. Examples include propylene glycol, sucrose, glucose, glucose syrups, sorbitol, low molecular weight polypeptides (for example fish solubles), glycerol and salt.

While a humectant will prevent bacterial growth it will not necessarily prevent mould or yeast growth. Accordingly it is preferred to incorporate an antimycotic additive, preferably in a concentration not exceeding 3%, for example up to 0.5% by weight of potassium sorbate or up to 1% by weight of propionic acid. Other suitable additives include benzoic acid, p-hydroxybenzoic acid esters and sorbic acid. When a humectant having antimycotic properties, for example propylene glycol, is used it may not be necessary to add a separate antimycotic.

The pH of the product can be adjusted to a desired value within the range 3.5 to 7.5 by the inclusion where necessary of up to 5% by weight of a food grade acid such as citric, propionic, malic, fumaric, hydrochloric, phosphoric or lactic acid.

The preferred polysaccharide gelling agents, as well as containing non-glucosidic monosaccharide units alone or together with glucose residues, also have acidic substituent groups, for example carboxyl or sulphate groups, which may be free or esterified. The present most preferred gelling system is a mixture of xanthan and carob gums. Other polysaccharide gelling agents can, however, be used, such as carrageenan, furcellaran, agar-agar or a pectin which has a degree of methoxyl esterification of less than 40%.

Xanthan gum is a relatively low cost gum obtained from the microbial fermentation of sugars and mineral salts by a bacteria of the genus Xanthomonas. The gum obtained from the preferred bacterium *Xanthomonas campestris* has been cleared for food use by the U.S. Food Drug Administration. Xanthan gum is relatively stable to the humectants which are used in semi-moist products and is generally applicable in other types of products, e.g. those including acidulants. It is, however, not able to form gels. The addition of carob gum, a non-gelling polysaccharide obtained from the seeds of the leguminous carob gum tree *Ceratonia siliqua*, to xanthan gum produces an agent capable of forming a thermoreversible gel which appears to be relatively unaffected by, among other things, low pH and high water activity conditions.

A significant advantage which stems from the use of the polysaccharide gelling agents used in this invention is that the quantity needed to obtain the required textural effect may be a low percentage of the composition of the product (preferably from 0.2 to 5% by weight) and this allows relatively high moisture contents in the formulations with consequent acceptance and price advantages. A further advantage to be gained from the use of these gelling agents is the ease with which the final product can be manufactured.

Besides the protein material, humectant, gel, and optional antimycotic additive and acid, other ingredients can be included, such as are commonly included in meat-like products. Among these ingredients can be fats, oils, flavourings, nutritional supplements, and colourings. It is preferred that the fats and oils constitute 0 to 25% of the product. Well-refined fats and oils with a low free fatty acid concentration give a weaker product in which the fat or oil is poorly emulsified as the fat or oil coalesces, interfering with both structure and appearance. On the other hand, high free fatty acid fats or oils readily emulsify and cause no loss of strength in the gel. Preferred oils are vegetable oils such as arachis, soya, sunflower and rape.

The invention also provides a process for preparing the food product, which process comprises forming a mixture of the polysaccharide gelling agent, protein material (with added water if dry), humectant and any other ingredients at a temperature above the melting point of the gel formed by solution of the gelling agent in the aqueous phase, and cooling the mixture below the melting point of the gel so as to form a gelled food product stabilized against bacterial growth.

The mixture may be formed in a variety of ways. One preferred process involves pasteurizing the protein material at 100° C. with water if needed and the other ingredients and homogenizing the mixture. This is then followed by the addition of the gelling agent and humectant. The method of cooling may be varied according to the desired texture and product form required.

A simple process is to deposit the mixture onto a tray and cool under an air flow prior to cutting. Alternatively the mixture can be extruded through a simple extrusion plate and cut off into suitably sized pieces.

If required the mixture can be extruded at elevated temperature and pressure so as to create an expanded product. Such a technique produces an aerated spongy appearance in the product simulating certain offal meats such as lung. However, if a meat-coloured mixture is extruded and expanded together with a fat-coloured mixture and the co-extruded product is allowed to set under controlled temperature conditions the product has a desirable variegated appearance closely approaching the appearance of fibrous meat with fatty tissue.

The invention will now be described further by way of six examples, in which all percentages are by weight unless the context otherwise requires.

EXAMPLE 1

| Tripe | 59.55% |
|---|---|
| Beef dripping | 15% |
| Glycerol | 20% |
| Potassium sorbate | 0.1% |
| Carob gum | 1.0% |
| Xanthan gum | 1.0% |
| Dyestuff soln. | 0.35% |
| Citric Acid | 3.0% |

The meat and beef dripping were heated together with stirring at 100° C. After 20 minutes the gums and citric acid were mixed in and heated for a further 5 minutes. The heated mix was then made up to the original weight with boiling water, transferred to a high speed homogeniser and the remaining ingredients added. The mix was poured into a tray, allowed to cool and cut into suitably sized pieces before packing. The product had a tough and firm structure similar to that of meat, with a pH value of 3.6 and $A_w$ of 0.88. Alternatively, the hot mix can be extruded through a mincer plate on to a cool conveyor belt.

EXAMPLE 2

| Fibrous meat | 44.55% |
|---|---|
| Beef dripping | 15% |
| Glycerol | 20% |
| Sugar | 18% |
| Potassium sorbate | 0.1% |
| Carob gum | 1.0% |
| Xanthan gum | 1.0% |
| Dyestuff soln. | 0.35% |

The meat, beef dripping and sugar were heated together with stirring at 100° C. After 20 minutes the gums, sorbate and dyes were added, with sufficient water to compensate for the water lost on heating. The mixture was transferred to a high speed homogeniser and the glycerol added. The mix was poured into a tray and allowed to cool and the solidified product cut into suitably sized pieces and packed.

The product had a similar appearance to meat although its texture was softer than that of Example 1. The water activity was 0.84 and the pH 6.5.

EXAMPLE 3

| Pig maws | 59.23% |
|---|---|
| Beef dripping | 15% |
| Glycerol | 20% |
| Potassium sorbate | 0.1% |
| Carob gum | 1.0% |
| Carrageenan | 1.0% |
| Dyestuff soln. | 0.67% |
| Citric acid | 3.0% |

The product was prepared in the manner described in Example 1 and was found to have a less elastic, more brittle texture. The water activity was 0.90 and the pH 3.6.

EXAMPLE 4

| Beef dripping | 10% |
|---|---|
| Tripe | 60.5% |
| Propylene glycol | 6% |
| Glycerol | 6% |
| Sucrose | 10% |
| Xanthan | 1% |
| Carob gum | 1% |
| Potassium sorbate | 0.5% |
| Dyestuff soln. | 0.01% |
| Greaves | 2.49% |
| Salt | 2.5% |

The tripe, beef dripping and greaves were heated together with stirring at 100° C. After 10 minutes the remaining ingredients were added and the mixture heated for a further 5 minutes. The mixture was made up to 95% of the original weight with boiling water, then transferred to a high speed homogeniser and mixed. The final mix was poured onto a tray and allowed to cool before packing. The $A_w$ was 0.82 and pH 6.5.

EXAMPLE 5

| Beef dripping | 5% |
|---|---|
| Tripe | 79.3% |

| -continued | |
|---|---|
| Propylene glycol | 5% |
| Glycerol | 5% |
| Xanthan | 1% |
| Carob gum | 1% |
| Potassium sorbate | 0.5% |
| Citric acid | 1.2% |
| Salt | 2% |

This product was made up in a similar way to the above product. The $A_w$ was 0.93 and pH 4.2.

EXAMPLE 6

| Beef dripping | 5% |
|---|---|
| Maws | 60% |
| Liver | 7% |
| Fish solubles | 5.5% |
| Propylene glycol | 5% |
| Glycerol | 5% |
| Carob gum | 1% |
| Xanthan | 1% |
| Potassium sorbate | 0.5% |
| Salt | 3% |
| Citric acid | 2% |
| Fish meal | 5% |

Beef dripping, maws, liver, fish solubles and fish meal were heated together for 10 minutes at 100° C. The remaining ingredients were added and heated for a further 5 minutes. The mix was transferred to a high speed mixer and mixed for 2 minutes. The final mix was transferred to a try, allowed to cool, and then minced through a 5 mm plate prior to packing. The $A_w$ was 0.90 and pH 4.2.

We claim:

1. A solid, bacterially stabilized food product having elastic chewing properties and being fluidizable with heat and setting to a gelatinous solid upon cooling, said product comprising: edible solids containing subdivided edible protein material which constitutes at least 10% by weight of said product; 0–25% fat; 0–3% antimycotic; 5–40% humectant; and a matrix bonding said edible material together consisting of a thermoreversible gelatable gum gelating agent prepared from a polysaccharide containing monosaccharide units other than glucose residues, said gelling agent constituting 0.2–5% of said product and being selected from the group consisting of xanthan and carob gums, carrageenan, furcellaran, agar-agar, pectin having a degree of methoxyl esterification of less than 40% and mixtures thereof; said food product having a pH between about 3.5 and 4.5 and a bacteriostatic water activity of from about 0.75 to about 0.95, and containing from about 30% to 70% by weight moisture, the total concentration of said one or more humectants plus said moisture being greater than about 40% by weight.

2. The food product of claim 1 wherein the polysaccharide gelling agent is a mixture of xanthan and carob gums.

3. The food product of claim 1 wherein said edible material contains from about 30 to about 80% by weight of natural edible protein material and the gelatable gum is a member of the group consisting of xanthan, carrageenan, and furcelloran gums and mixtures thereof with carob gum.

4. A process for preparing a food product of edible solids held together in a gel matrix, said edible solids including edible protein material, said process comprising the steps of:
preparing a mix comprising at least 30% by weight of said edible protein material, and 5–40% in total of at least one humectant, and containing about 30 to 70% moisture providing an aqueous phase, the total concentration of said humectants plus said moisture being greater than about 40% by weight;
heating said mix to pasteurize it;
homogenizing said mix;
adding a polysaccharide gelling agent containing monosaccharide units other than glucose residues and acidic substituent groups (free of esterified) and capable of forming with water a thermoreversible gel having a melting point above ambient temperature, said gelling agent being selected from the group consisting of xanthan and carob gums, carrageenan, furcellaran, agar-agar, pectin having a degree of methoxyl esterification of less than 40% and mixtures thereof;
adding said gelling agent to the mix to dissolve it in said aqueous phase to form a solution gellable on cooling;
and cooling said mix below the melting point of said gel and thereby causing the polysaccharide gelling agent to gel and provide said matrix of said product; said product having a pH between about 3.5 and about 4.5 and a bacteriostatic water activity of from about 0.95 to about 0.75.

5. The process of claim 3 wherein said polysaccharide gelling agent is a mixture of xanthan and carob gums.

6. The process according to claim 3 wherein said mixture is deposited onto a tray and cooled under an air flow.

7. The process according to claim 3 wherein said mixture is extruded.

8. The process according to claim 3 wherein said mixture is extruded at elevated temperature and pressure so as to create an expanded product.

9. A solid gelatinous food product stable at ambient temperatures having elastic chewing properties and being fluidizable with heat and reversibly setting to a gelatinous solid on cooling, said product having a high moisture content and being stabilized against bacterial growth, and having a bacteriostatic water activity in the range of about 0.75 to about 0.95, said product having a pH in the range of from about 3.5 to about 4.5 and comprising 10–80% sub-divided edible protein materials, 5–40% humectant, about 30 to 70% moisture, the total quantity of said humectant and water being greater than about 40%, said food components being gelated with 0.2 to 5% of a thermoreversible gelating agent comprising a gel-forming polysaccharide containing monosaccharide units other than glucose residues, said gelating agent being selected from the group consisting of xanthan and carob gums, carrageenan, furcellaran, agar-agar, pectin having a degree of methoxyl esterification of less than 40% and mixtures thereof.

* * * * *